Patented Mar. 21, 1939

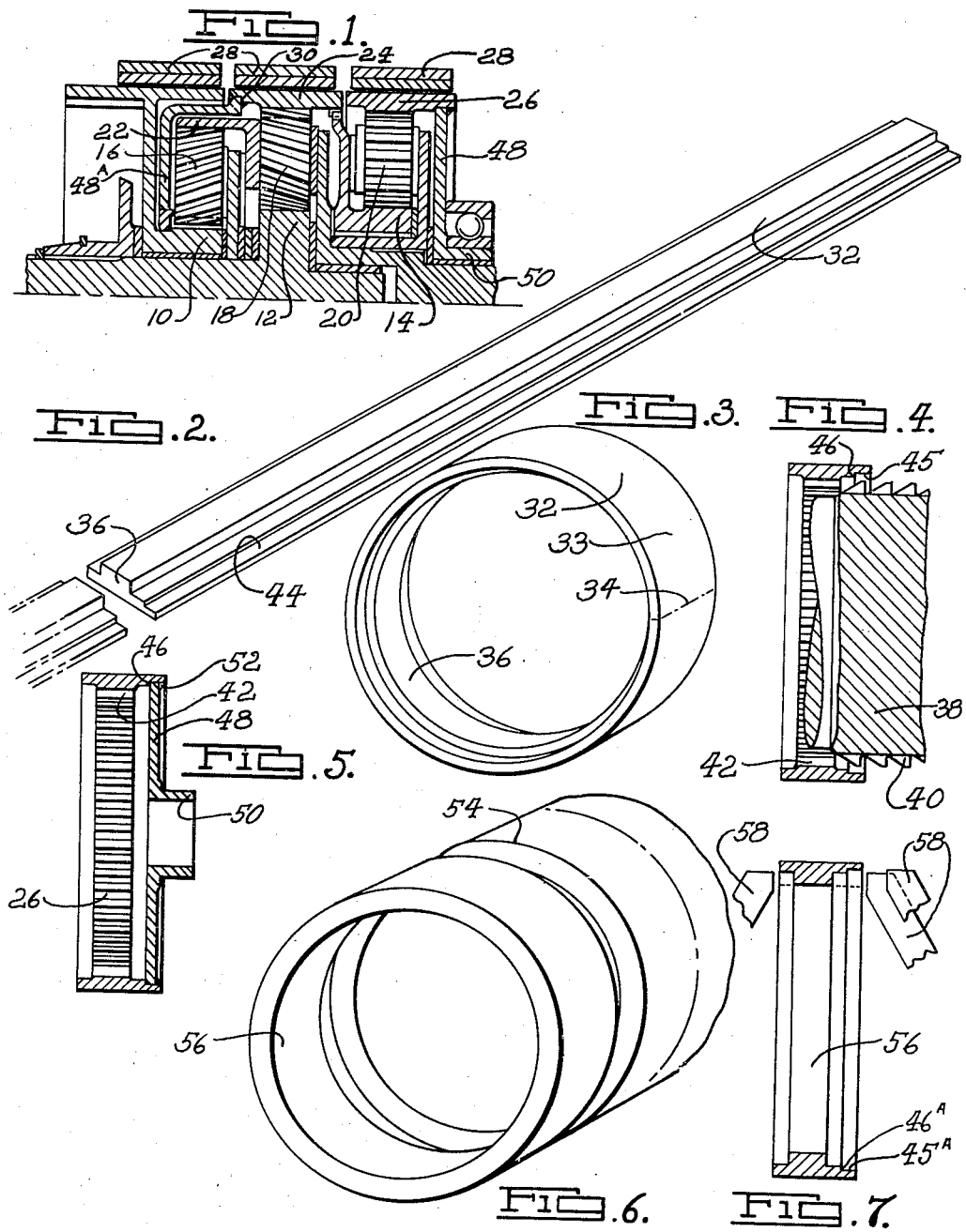

2,151,435

UNITED STATES PATENT OFFICE 2,151,435

METHOD OF MAKING GEARS

Carl A. Neracher, Detroit, Mich., assignor to Chrysler Corporation, Highland Park, Mich., a corporation of Delaware Application November 20, 1935, Serial No. 50,631

2 Claims. (Cl. 29—159.2)

This invention relates to gearing and refers more particularly to improvements in gears and methods of manufacturing the same. My invention relates particularly to internal gears of planetary gear sets although, in its broader aspects, my invention is not limited to any particular type of gear or gear train.

An object of this invention is to provide an economical method of fabricating annular gears, as strong as those cut from solid stock.

Other objects of my invention are to provide an improved gear having characteristics of low cost in its manufacture and improved methods of fabricating gears to reduce the cost thereof and to otherwise facilitate the manufacture thereof, especially gears of the aforesaid type.

A further object of my invention is to provide improvements in the manufacture of a ring gear by fabricating the gear from rolled and welded flat stock. A still further object of my invention, according to a further embodiment thereof, is to provide improvements in the manufacture of a ring gear by forming such gear from a section.

Further objects and advantages of my invention will be apparent from the following description and drawing illustrative of the principles of my invention and in which:

Fig. 1 is a fragmentary view showing in section parts of a planetary transmission, some of the gears of which are formed according to my invention, only the upper half being shown.

Fig. 2 is a perspective view of flat rolled stock having a shape suitable to the formation of my gears.

Fig. 3 is a perspective view of a piece of flat stock that has been rolled and welded into an annular ring.

Fig. 4 is a view partly in section showing the method of cutting the gear teeth on the inside surface of the annular blank of Fig. 3.

Fig. 5 is a view in section of the Fig. 4 annular gear having a supporting web secured thereto.

Fig. 6 is a perspective view of a modified form of blank according to an alternative method of forming the annular gear.

Fig. 7 is a view partly in section showing one of the machining processes for the Fig. 6 blank.

In Fig. 1 I have shown as one illustrative use of my gear, a part of a planetary type of transmission gearing in which there are three sun gears 10, 12 and 14. Intermeshing respectively with each sun gear there are sets of planet gears 16, 18 and 20, and intermeshing respectively with each set of planet gears there is an annular internal gear 22, 24 and 26. Brake bands 28 act in a well known manner to control each planetary train of gears to produce desired speed variations in the transmission. My invention deals primarily with the construction and method of forming one of the internal annular gears and for purposes of illustration I will hereinafter describe the construction of the annular gear 26.

A piece of flat rolled stock 32 (Fig. 2), having a suitable transverse section, is rolled into a gear ring blank 33 and the adjoining ends welded together as shown at 34 (Fig. 3).

The strip of stock 32 as used for the particular gear 26 is substantially rectangular in cross section with a rectangular rib or stepped portion 36 along the surface that is to be inside of the finished ring 33. This rib 36 is integral with the strip 32 and is of sufficient height and width to allow gear teeth 42 to be cut therein.

The gear ring blank 33 is mounted in a suitable chuck or holding means (not shown) and a broach 38, (Fig. 4) having suitable shaped cutting teeth 40 is forced through it. The cutting teeth 40 remove the unnecessary metal from the rib 36 and leave gear teeth 42. It is to be understood that any other method of forming the gear teeth 42 in the rib 36 may be employed if desired.

A depressed step 44 may be formed on the near edge of the strip stock 32 as viewed in Fig. 2. When the strip 32 is formed into the ring 33 the step 44 provides an annular recess 45 having an abutment or riser 46 at its inner end.

A circular supporting disc 48 having an axially extending shaft-receiving annular portion 50 is placed in the annular recess 45 of the gear ring 33, held against the abutting shoulder 46 and welded around its circumference to the ring 33 as shown at 52 in Fig. 5, thus completing the assembly of the gear 26.

Other of the internal gears may be likewise fashioned, such as gear 24 having its hub 48ª welded at 30.

As an alternative method of making the annular gear ring 33, I have shown in Fig. 6 a piece of seamless tubing 54 from which a section 56 has been cut.

The width, greatest thickness, and inner and outer diameters of the piece 56 are the same as the welded ring 33 where it is desired to fashion a similar gear.

The ring 56 is suitably machined as by the use of the suitable cutting tools 58 to form the annular recess 45ª and shoulder 46ª similar to corresponding parts of the aforesaid ring 33. The gear teeth are then broached in and further operations are formed on the ring 56 in the same manner as on the ring 33 for attaching a supporting hub where such a member is employed.

Either the bar stock 32 or the tubular stock 54 may be readily purchased in any desired metal and of sufficient size and shape and of smooth enough finish for the fabrication of annular gears of the type used in planetary transmissions with a very small amount of machining necessary.

Various modifications and changes will be apparent from the teachings of the principles of my invention, as set forth in the appended claims, and it is not my intention to limit my invention to the particular details of construction shown and described for illustrative purposes.

What I claim is:

1. The method of forming a ring gear from a substantially flat strip of material having longitudinally extending stepped portions projecting upwardly from one face thereof and disposed in a plane substantially parallel with the opposite face of said strip which comprises, bending said strip into cylindrical shape with said stepped portions interiorly thereof, uniting the abutting ends of said strip, forming gear teeth in one of said stepped portions, and securing a mounting disc to another of said stepped portions in juxtaposed relation to the riser of the latter step portion, whereby said riser locates and spaces said disc axially from the adjacent extremity of said tooth forming stepped portion and the tread of said second mentioned stepped portion centers said disc relative to said gear.

2. The method of forming a ring gear from a cylindrical piece of stock having a plurality of stepped portions in the inner face thereof which comprises, forming gear teeth in one of said stepped portions, and securing a mounting disc to another of said stepped portions in juxtaposed relation to the riser of the latter stepped portion whereby said riser locates and spaces said disc axially from the adjacent extremity of said tooth-forming stepped portion and the tread of said second mentioned stepped portion centers said disc relative to said gear.

CARL A. NERACHER.